(12) United States Patent
Smith et al.

(10) Patent No.: US 7,980,768 B2
(45) Date of Patent: Jul. 19, 2011

(54) FIBER OPTIC CONNECTOR HOLDER AND METHOD

(75) Inventors: Trevor D. Smith, Eden Prairie, MN (US); Thomas C. Tinucci, Chaska, MN (US); Cindy S. Walters, Prior Lake, MN (US); James W. Conroy, Prior Lake, MN (US); Joel B. Douglas, Hutchinson, MN (US); Kathleen M. Barnes, Golden Valley, MN (US); Marlon E. Holmquist, Gibbon, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/908,271

(22) Filed: Oct. 20, 2010

(65) Prior Publication Data

US 2011/0033158 A1 Feb. 10, 2011

Related U.S. Application Data

(63) Continuation of application No. 12/185,504, filed on Aug. 4, 2008, now Pat. No. 7,841,775, which is a continuation of application No. 11/729,425, filed on Mar. 27, 2007, now Pat. No. 7,407,330, which is a continuation of application No. 10/610,325, filed on Jun. 30, 2003, now Pat. No. 7,198,409.

(51) Int. Cl.
*G02B 6/36* (2006.01)

(52) U.S. Cl. ........................................................ 385/53

(58) Field of Classification Search ................. 385/53, 385/58, 70
See application file for complete search history.

(56) References Cited

U.S. PATENT DOCUMENTS

| 4,736,100 A | 4/1988 | Vastagh |
| 4,747,020 A | 5/1988 | Brickley et al. |
| 4,792,203 A | 12/1988 | Nelson et al. |
| 4,824,196 A | 4/1989 | Bylander |

(Continued)

FOREIGN PATENT DOCUMENTS

EP 0 743 701 A2 11/1996

(Continued)

OTHER PUBLICATIONS

Drawings showing an ADC fiber storage trough concept including presentation entitled "Fujitsu Fiber Management Project Fiber Trough Concept", 11 pages (Jun. 2002).

(Continued)

*Primary Examiner* — Javaid Nasri
(74) *Attorney, Agent, or Firm* — Merchant & Gould P.C.

(57) ABSTRACT

A fiber optic connector holder is sized to fit within an opening for mounting a fiber optic adapter. The fiber optic connector holder is configured to permit a fiber optic connector with a dust cap positioned about a ferrule and a polished end face of an optical fiber held by the ferrule to be inserted within and releasably held by the connector holder. A system for holding fiber optic connectors includes a fiber optic connector holder mounted within an opening in a bulkhead for mounting a fiber optic adapter. The fiber optic connector holder is configured to receive a fiber optic connector with a dust cap mounted about a ferrule and polished end face of an optical fiber held by the ferrule. A optical fiber connector may be held to a bulkhead when the fiber optic connector includes a dust cap mounted about a ferrule and a polished end face of an optical fiber held by the ferrule.

20 Claims, 8 Drawing Sheets

U.S. PATENT DOCUMENTS

| | | | |
|---|---|---|---|
| 4,861,134 A | 8/1989 | Alameel et al. |
| 4,900,123 A | 2/1990 | Barlow et al. |
| 4,948,220 A | 8/1990 | Violo et al. |
| 4,995,688 A | 2/1991 | Anton et al. |
| 5,023,646 A | 6/1991 | Ishida et al. |
| 5,058,983 A | 10/1991 | Corke et al. |
| 5,073,042 A | 12/1991 | Mulholland et al. |
| 5,076,688 A | 12/1991 | Bowen et al. |
| 5,142,598 A | 8/1992 | Tabone |
| 5,214,735 A | 5/1993 | Henneberger et al. |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,363,465 A | 11/1994 | Korkowski et al. |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,469,526 A | 11/1995 | Rawlings |
| 5,497,444 A | 3/1996 | Wheeler |
| 5,506,922 A | 4/1996 | Grois et al. |
| 5,511,144 A | 4/1996 | Hawkins et al. |
| 5,542,015 A | 7/1996 | Hultermans |
| 5,647,043 A | 7/1997 | Anderson et al. |
| 5,708,751 A | 1/1998 | Mattei |
| 5,734,776 A | 3/1998 | Puetz |
| 5,764,844 A | 6/1998 | Mendes |
| 5,774,612 A | 6/1998 | Belenkiy et al. |
| 5,778,132 A | 7/1998 | Csipkes et al. |
| 5,784,515 A | 7/1998 | Tamaru et al. |
| 5,823,646 A | 10/1998 | Arizpe et al. |
| 5,825,955 A | 10/1998 | Ernst et al. |
| 5,883,995 A | 3/1999 | Lu |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 5,975,769 A | 11/1999 | Larson et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,069,797 A | 5/2000 | Widmayer et al. |
| 6,076,975 A | 6/2000 | Roth |
| 6,079,881 A | 6/2000 | Roth |
| 6,096,797 A | 8/2000 | Prantl et al. |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,247,849 B1 | 6/2001 | Liu |
| 6,256,443 B1 | 7/2001 | Uruno et al. |
| 6,259,850 B1 | 7/2001 | Crosby, Jr. et al. |
| 6,271,484 B1 | 8/2001 | Tokutsu |
| 6,278,829 B1 | 8/2001 | BuAbbud et al. |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,483,977 B2 | 11/2002 | Battey et al. |
| 6,496,640 B1 | 12/2002 | Harvey et al. |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 * | 4/2003 | Lampert ............ 385/78 |
| 6,554,485 B1 | 4/2003 | Beatty et al. |
| 6,556,763 B1 | 4/2003 | Puetz et al. |
| 6,577,595 B1 | 6/2003 | Counterman |
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| 6,654,536 B2 | 11/2003 | Battey et al. |
| 6,661,961 B1 | 12/2003 | Allen et al. |
| 6,668,127 B1 | 12/2003 | Mahony |
| 6,678,457 B2 | 1/2004 | Kim et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,768,860 B2 | 7/2004 | Liberty |
| 6,778,752 B2 | 8/2004 | Laporte et al. |
| 6,788,786 B1 | 9/2004 | Kessler et al. |
| 6,792,190 B2 | 9/2004 | Xin |
| 6,792,191 B1 | 9/2004 | Clapp, Jr. et al. |
| 6,815,612 B2 | 11/2004 | Bloodworth et al. |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,901,200 B2 | 5/2005 | Schray |
| 6,909,833 B2 | 6/2005 | Henschel et al. |
| 6,920,274 B2 | 7/2005 | Rapp et al. |
| 6,925,241 B2 | 8/2005 | Bohle et al. |
| 6,950,593 B2 | 9/2005 | Hodge et al. |
| 6,980,725 B1 | 12/2005 | Swieconek |
| 6,983,095 B2 | 1/2006 | Reagan et al. |
| 7,029,322 B2 | 4/2006 | Ernst et al. |
| 7,142,764 B2 | 11/2006 | Allen et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,407,330 B2 | 8/2008 | Smith et al. |
| 7,457,503 B2 | 11/2008 | Solheid et al. |
| 2001/0001270 A1 | 5/2001 | Williams Vigliaturo |
| 2002/0034290 A1 | 3/2002 | Pershan |
| 2002/0176681 A1 | 11/2002 | Puetz et al. |
| 2002/0181893 A1 | 12/2002 | White et al. |
| 2003/0002812 A1 | 1/2003 | Lampert |
| 2003/0113086 A1 | 6/2003 | Jun et al. |
| 2003/0174996 A1 | 9/2003 | Henschel et al. |
| 2003/0207601 A1 | 11/2003 | Adachi |
| 2004/0074852 A1 | 4/2004 | Knudsen et al. |
| 2004/0126069 A1 | 7/2004 | Jong et al. |
| 2004/0165852 A1 | 8/2004 | Erwin et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0129379 A1 | 6/2005 | Reagan et al. |
| 2005/0163448 A1 | 7/2005 | Blackwell, Jr. et al. |
| 2006/0083475 A1 | 4/2006 | Grubish et al. |
| 2006/0115220 A1 | 6/2006 | Elkins, II et al. |
| 2006/0204200 A1 | 9/2006 | Lampert et al. |
| 2009/0074372 A1 | 3/2009 | Solheid et al. |

FOREIGN PATENT DOCUMENTS

| | | |
|---|---|---|
| EP | 0 788 002 A1 | 8/1997 |
| EP | 0 871 047 A1 | 10/1998 |
| EP | 0 975 180 A1 | 1/2000 |
| EP | 1 045 267 A1 | 10/2000 |

| | | |
|---|---|---|
| JP | 63-229409 | 9/1988 |
| WO | WO 98/53347 | 11/1998 |
| WO | WO 00/75706 A2 | 12/2000 |
| WO | WO 02/103429 A2 | 12/2002 |
| WO | WO 2004/032532 A2 | 4/2004 |

OTHER PUBLICATIONS

Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).
"Retainer Staright [sic] Removable SC," which shows a latch design, 2 pages (Jan. 17, 2006).
Brochure from Amphenol Corp. entitled "Amphenol® 954 Series one piece SC Connector," 2 pgs. (1990).
AMP Inc. catalog entitled "Fiber Optic Products," front and back covers and p. 59, (4 pgs.) (©1991).
HRS catalog entitled "Optical Fibre Connectors," front and back covers and pp. 16, 17 and 49 (5 pages) (Mar. 1991).
AT&T Network Systems catalog entitled "Fiber Optic Products Innovation for wide ranging applications," front and back covers and pp. 6-1 through 6-16 (18 pages) (©1995).
ADC Telecommunications, Inc.'s Outside Plant, Fiber Cross-Connect Solutions Products Brochure; front cover, Table of Contents, pp. 1-48, and back cover.; revised Jun. 2002, Item No. 1047.
ADC Telecommunications, Inc.'s 6th Edition of Next Generation Frame (NGF) Product Family Ordering Guide; front cover, Table of Contents, pp. 1-41, and back cover; revised Feb. 2003, Item No. 820.
ADC Telecommunications, Inc.'s Fiber Optic, Cable Assemblies and Accessories Brochure; front cover, Table of Contents, pp. 1-23, and back cover; revised Apr. 2003, Item No. 100300.
ADC Telecommunications, Inc.'s OMX™ 600, Optical Distribution Frame Brochure; front cover, Table of Contents, pp. 1-14, and back cover; revised Feb. 2001, Item No. 854.
Iwano, S. et al., "MU-type Optical Fiber Connector System," *NTT Review*, vol. 9, No. 2, pp. 63-71 (Mar. 1997).
NTT Int'l Fiber Termination Module (FTM) & Premises Optical Distribution Cabinets (PODC) product brochure, 3 pages, undated.
Sugita, E. et al., "SC-Type Single-Mode Optical Fiber Connectors," *Journal of Lightwave Technology*, vol. 7, No. 11, pp. 1689-1696 (Nov. 1989).
24 photos of LambdaUnite® Blank Card; "LambdaUnite® MultiService Switch (MSS)" brochure (2003); and "Lucent's LambdaUnite® Busts Out" official release (Jan. 29, 2002).
Complaint relating to Civil Action No. 08-CV-5222-RMK-JJK, filed Sep. 19, 2008 (8 pages).
ADC's Reply to Counterclaims and Counterclaims relating to *ADC Telecommunications, Inc. v. Tyco Electronics Corp.*, Civil Action No. 08-CV-05222, filed Apr. 2, 2009.
Stipulated Dismissal of all Claims and Counterclaims relating to *ADC Telecommunications, Inc. v. Tyco Electronics Corp.*, Civil Action No. 08-CV-05222, filed Oct. 30, 2009.
20 photographs showing what AFL Telecommunications LLC purports to be the ECOE cabinet referenced in the Prior art statement and the Supplemental prior art statement listed above. AFL Telecommunications LLC asserts the cabinet shown in the photographs was on sale as early as 2001.
Complaint relating to Civil Action No. 08-CV-02234-DWF-JSM, filed Jun. 13, 2008.

First Amended Complaint, *ADC Telecommunication, Inc. and Fiber Optic Network Solutions Corp. v. AFL Telecommunications LLC*, Civil Action No. 0:08-cv-02234-DWF-JSM, 8 pages (Aug. 14, 2008).
Defendant's Answer and Defenses in Response to the First Amended Complaint, *ADC Telecommunication, Inc. and Fiber Optic Network Solutions Corp. v. AFL Telecommunications LLC*, Civil Action No. 0:08-cv-02234-DWF-JSM, 14 pages (Dec. 8, 2008).
Amended Order for Pretrial Conference, *ADC Telecommunication, Inc. and Fiber Optic Network Solutions Corp. v. AFL Telecommunications LLC*, Civil Action No. 0:08-cv-02234-DWF-JSM, 5 pages (Dec. 11, 2008).
Prior art statement submitted by AFL Telecommunications LLC in Civil Action No. 08-CV-02234-DWF-JSM on May 11, 2009 (145 pages).
Supplemental prior art statement submitted by AFL Telecommunications LLC in Civil Action No. 08-CV-02234-DWF-JSM on May 19, 2009 (155 pages).
Response to prior art statement submitted by ADC Telecommunications, Inc. in Civil Action No. 08-CV-02234-DWF-JSM on Aug. 18, 2009 (131 pages).
Second supplemental prior art statement submitted by AFL Telecommunications LLC in Civil Action No. 08-CV-02234-DWF-JSM on Nov. 10, 2009 (8 pages).
Joint Claim Construction Statement, relating to Civil Action No. 08-CV-02234, filed Nov. 17, 2009 (40 pages).
Plaintiff ADC's Markman Brief (Redacted Version), filed Feb. 9, 2010, relating to Civil Action No. 08-CV-02234-DWF-JSM (99 pages).
Defendant AFL Telecommunications LLS's Memorandum in Support of Proposed Claim Construction, (AFL's Markman Brief), filed Feb. 9, 2010, relating to Civil Action No. 08-CV-02234 (42 pages).
Plaintiff ADC's Responsive Markman Brief, filed Mar. 9, 2010, relating to Civil Action No. 08-CV-02234 (21 pages).
Defendant AFL Telecommunications LLC's Answering Claim Construction Brief, filed Mar. 9, 2010, relating to *ADC Telecommunications, Inc. v. AFL Telecommunications LLC*, Civil Action No. 08-CV-02234 (60).
Stipulated Dismissal of all Claims and Counterclaims relating to *ADC Telecommunications, Inc. v. AFL Telecommunications LLC*, Civil Action No. 08-CV-02234, filed Jul. 27, 2010 (2 pages).
Dismissal Order relating to *ADC Telecommunications, Inc. v. AFL Telecommunications LLC*, Civil Action No. 08-CV-02234, filed Jul. 28, 2010 (1 page).
Nexans, Cross-Connect Cabinet III: Plastic Watertight Cabinet for FTTH Applications, dated 2002 (2 pages).
Nexans, Cross-Connect Cabinet V: Metallic Watertight Cabinet for FTTH Applications, dated 2002 (2 pages).
Optical fiber coupler review, Technical Report 2001, showing Sumitomo Osaka Cement Co. Ltd's Optical Coupler (pp. 41-42).
Hasegawa et al., *100GHz-48CH Athermal AWG with a Novel Temperature Insensitive Principle*, National Fiber Optics Engineers Conference, 2003 Technical Proceedings, pp. 801-808.
ATI Optique Catalog, ATI Optique Division of TI electronique, Version 2.6, released Mar. 27, 2002 (50 pages).
Tachikura et al., *Newly Developed Optical Fiber Distribution System and Cable Management in Central Office*, International Wire & Cable Symposium, Proceedings of the 50$^{th}$ IWCS, pp. 98-105.
*Couplers: Couplers WDMS Packaging*, Alcoa Fujikura Ltd., Telecommunications Division, © 2000 (5 pages) showing AFL splitters.
European Search Report mailed Nov. 19, 2009 for European Application No. 09011819, which claims priority to previously cited U.S. Patent No. 7,198,409 (7 pages).

\* cited by examiner

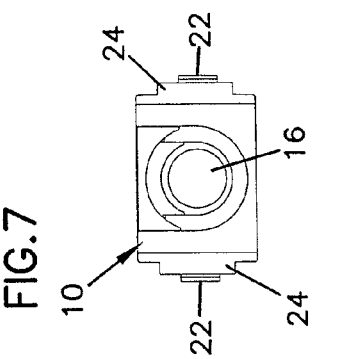
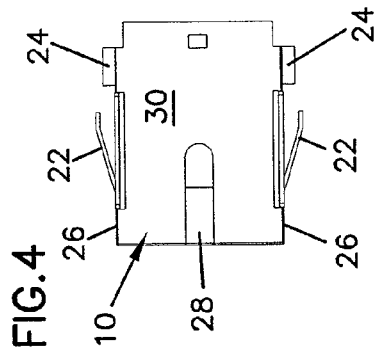
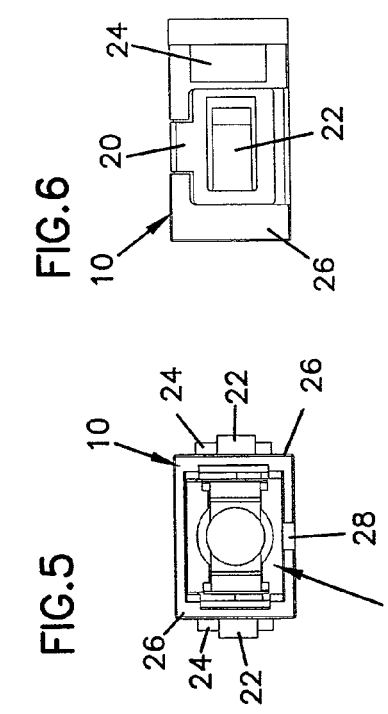
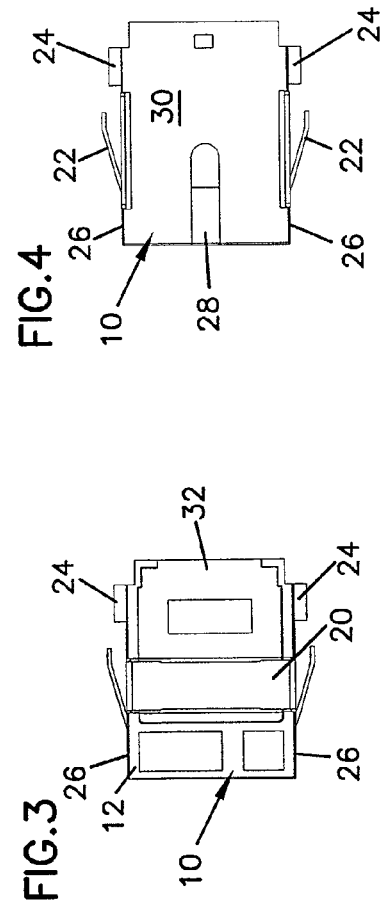
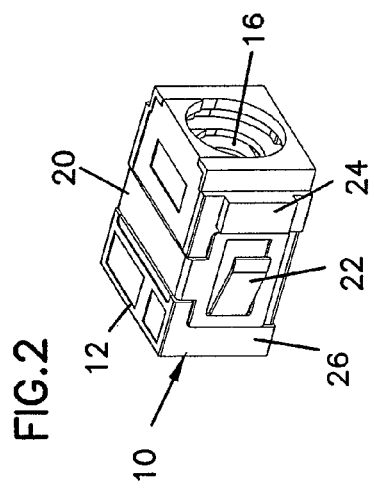
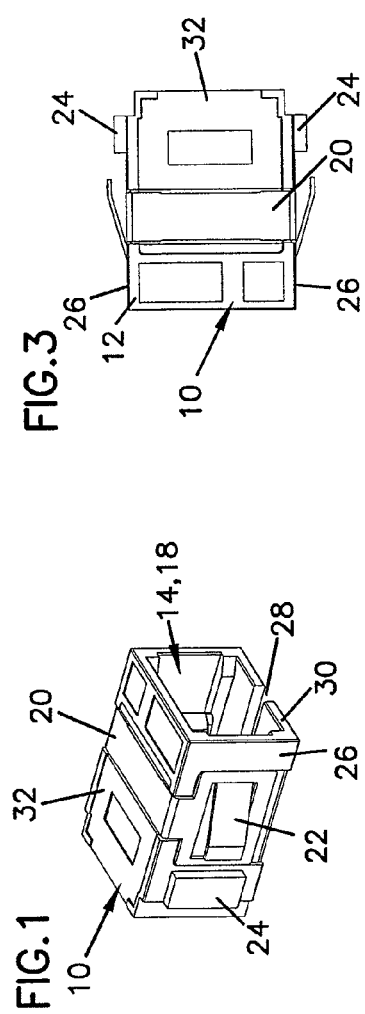

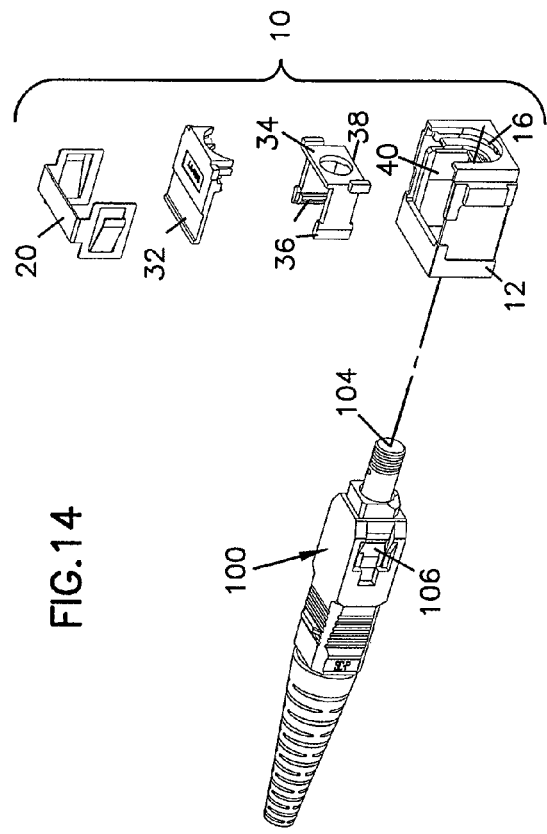
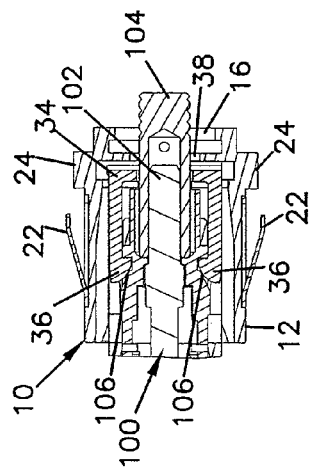
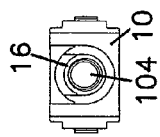
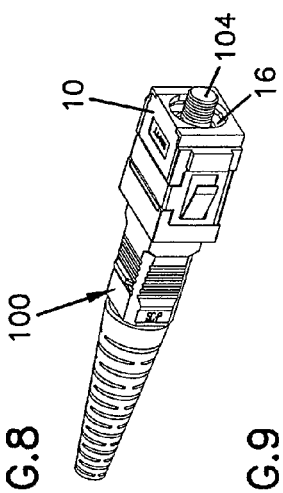
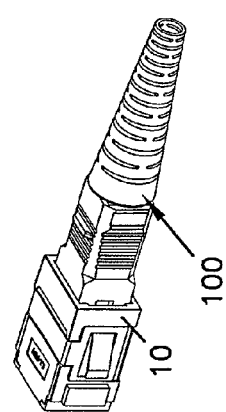
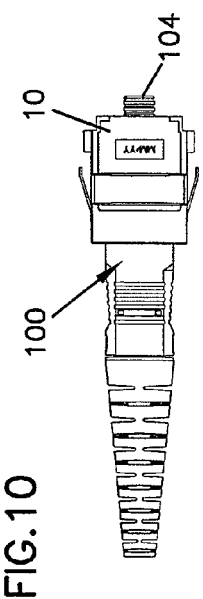
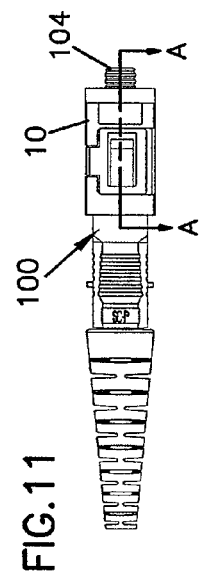

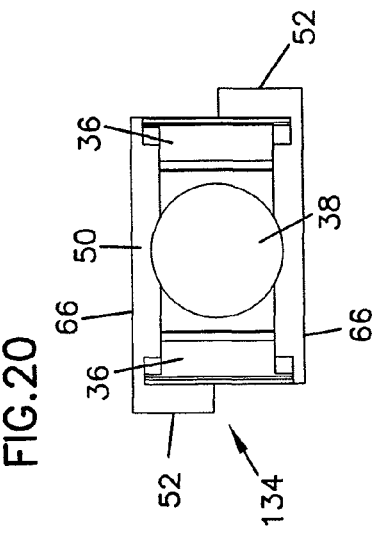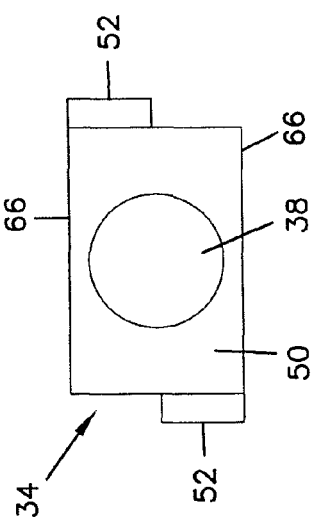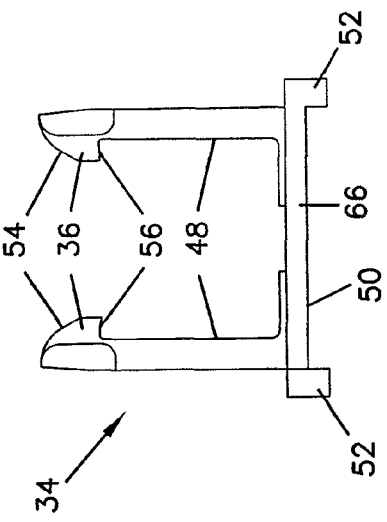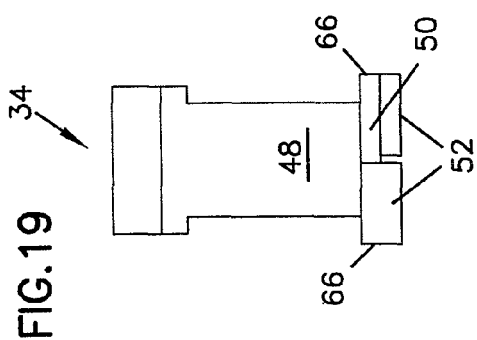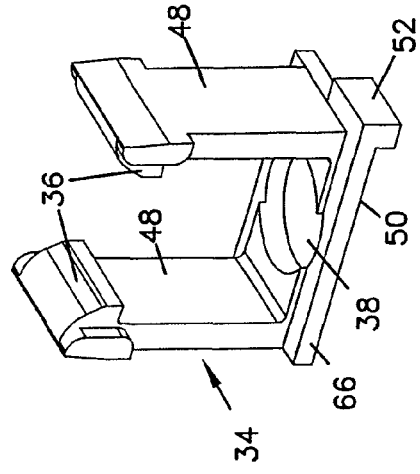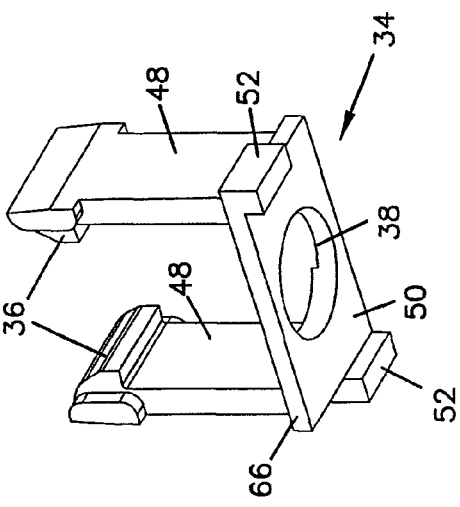

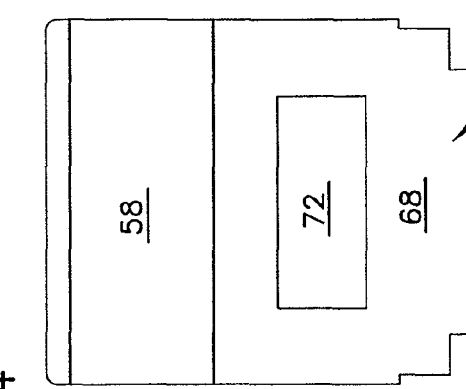
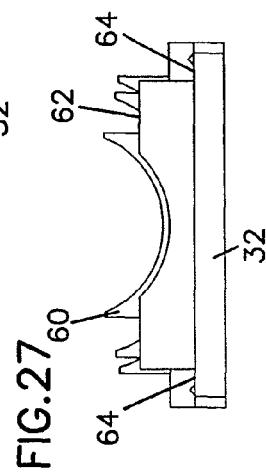
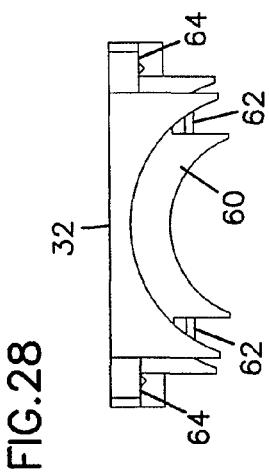
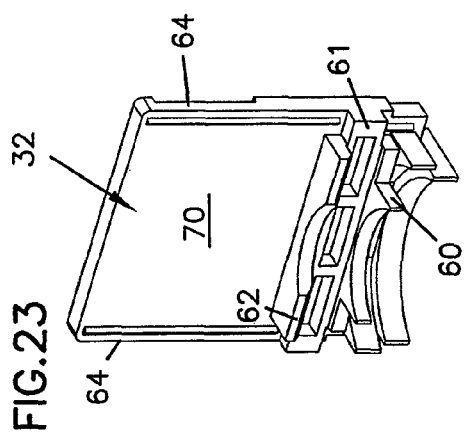
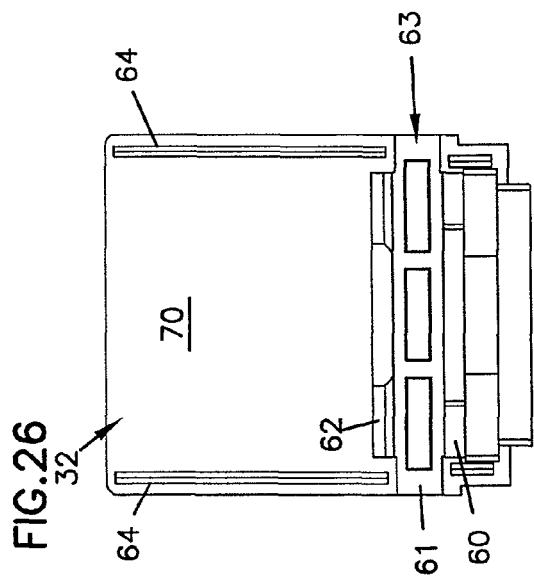
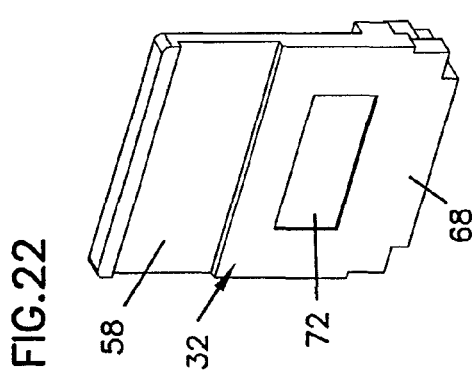
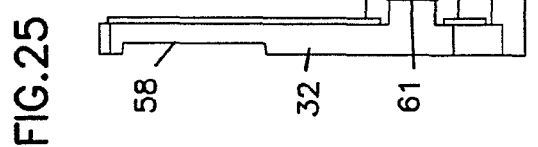

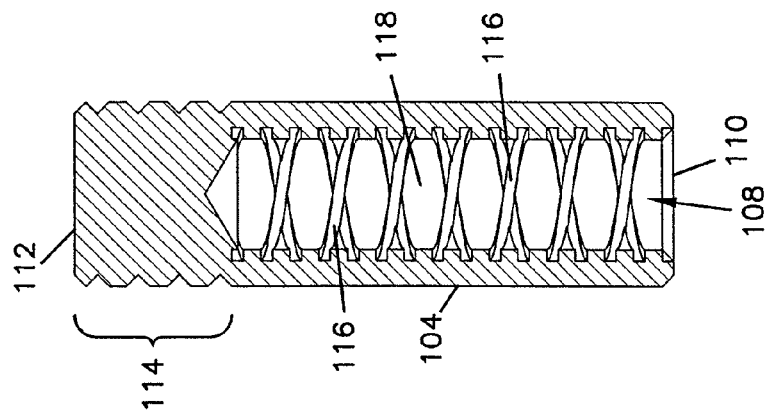
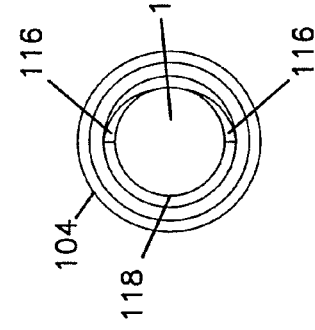
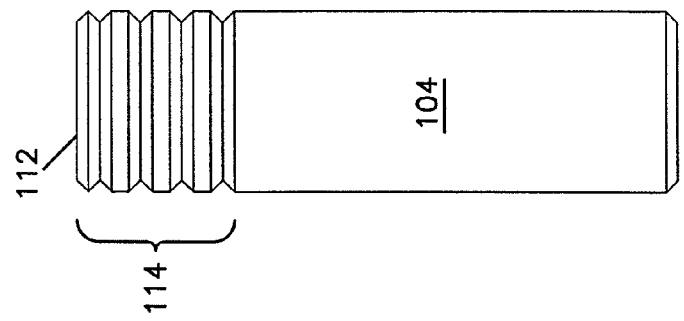
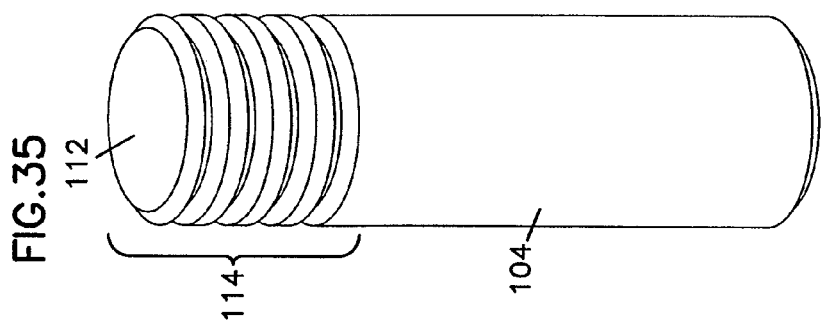

FIBER OPTIC CONNECTOR HOLDER AND METHOD

CROSS REFERENCE TO RELATED APPLICATIONS

This application is a continuation of application Ser. No. 12/185,504, filed Aug. 4, 2008, now U.S. Pat. No. 7,841,775, which is a continuation of application Ser. No. 11/729,425, filed Mar. 27, 2007, now U.S. Pat. No. 7,407,330, which is a continuation of application Ser. No. 10/610,325, filed Jun. 30, 2003, now U.S. Pat. No. 7,198,409, which applications are incorporated herein by reference in their entirety.

TECHNICAL FIELD

The present invention generally relates to holders for fiber optic connectors and more specifically relates to holders for fiber optic connectors which are protected by dust caps.

BACKGROUND

Fiber optic connectors include a polished end face, typically held by a ferrule, which permits positioning of the optical fiber held by the connector to receive and transmit signals another optical fiber or optical light source. It is desirable to keep these polished end faces as free of contaminants as possible to improve the transmission of light to and from the optical fiber held by the connector. Such contaminants which might adversely impact the transmission of light to and from the optical fiber include but are not limited to dust and finger prints.

Dust caps may be provided for connectors to protect the polished end face of the optical fiber. However, when such dust caps are in place, the connector is not capable of being received in known optical fiber adapters, such as those described in U.S. Pat. Nos. 5,317,663, and 6,347,888. The disclosures of these patents are incorporated herein by reference. A connector may be inserted into one of these known adapters for storage or pre-wiring of a cross-connection point, an interconnection point or some other type telecommunications switching or connection equipment with the dust cap removed. While the adapters might provide some protection from contaminants to a single connector inserted into an adapter, these adapters are not as effective as a dust cap in protecting the polished end face.

It is desirable to improve the known methods and apparatus for protecting the polished end face of a fiber optic connector within telecommunications equipment.

SUMMARY

The present invention relates to a fiber optic connector holder sized to fit within an opening for mounting a fiber optic adapter. The fiber optic connector holder is configured to permit a fiber optic connector with a dust cap positioned about a ferrule and a polished end face of an optical fiber held by the ferrule to be inserted within and releasably held by the connector holder.

The present invention further relates to a system for holding fiber optic connectors including a fiber optic connector holder mounted within an opening in a bulkhead for mounting a fiber optic adapter. The fiber optic connector holder is configured to receive a fiber optic connector with a dust cap mounted about a ferrule and polished end face of an optical fiber held by the ferrule. The connector holder may be removed from the bulkhead and a fiber optic adapter may be mounted within the same opening.

The present invention also relates to a method of holding an optical fiber connector to a bulkhead, when the fiber optic connector includes a dust cap mounted about a ferrule and a polished end face of an optical fiber held by the ferrule.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 1 is a first perspective view of a fiber optic connector holder according to the present invention.

FIG. 2 is a second perspective view of the fiber optic connector holder of FIG. 1.

FIG. 3 is a top view of the fiber optic connector holder of FIG. 1.

FIG. 4 is a bottom view of the fiber optic connector holder of FIG. 1.

FIG. 5 is a first end view of the fiber optic connector holder of FIG. 1.

FIG. 6 is a side view of the fiber optic connector holder of FIG. 1.

FIG. 7 is a second opposite end view of the fiber optic connector holder of FIG. 1.

FIG. 8 is a first perspective view of system for holder a fiber optic connector including the fiber optic connector holder of FIG. 1 with a fiber optic connector inserted.

FIG. 9 is a second perspective view of the system for holding a fiber optic connector of FIG. 8.

FIG. 10 is a top view of the system for holding a fiber optic connector of FIG. 8.

FIG. 11 is a side view of the system for holding a fiber optic connector of FIG. 8.

FIG. 12 is an end view of the system for holding a fiber optic connector of FIG. 8.

FIG. 13 is a cross-sectional view of the system for holding a fiber optic connector of FIG. 8, taken along line A-A in FIG. 11.

FIG. 14 is an exploded perspective view of the system for holding a fiber optic connector of FIG. 8.

FIG. 16 is a first perspective view of an inner housing of the fiber optic connector holder of FIG. 1.

FIG. 17 is a second perspective view of the inner housing of FIG. 16.

FIG. 18 is a top view of the inner housing of FIG. 16.

FIG. 19 is a side view of the inner housing of FIG. 16.

FIG. 20 is a first end view of the inner housing of FIG. 16.

FIG. 21 is a second end view of the inner housing of FIG. 16.

FIG. 22 is a first perspective view of the cover of the fiber optic connector holder of FIG. 1.

FIG. 23 is a second perspective view of the cover of FIG. 22.

FIG. 24 is a top view of the cover of FIG. 22.

FIG. 25 is a side view of the cover of FIG. 22.

FIG. 26 is a bottom view of the cover of FIG. 22.

FIG. 27 is a first end view of the cover of FIG. 22.

FIG. 28 is a second end view of the cover of FIG. 22.

FIG. 35 is a perspective view of the dust cap of the fiber optic connector of FIG. 14.

FIG. 36 is a side view of the dust cap of FIG. 35.

FIG. 37 is an end view of the dust cap of FIG. 35.

FIG. 38 is a cross-sectional view of the dust cap of FIG. 35.

DETAILED DESCRIPTION

Figure 15:
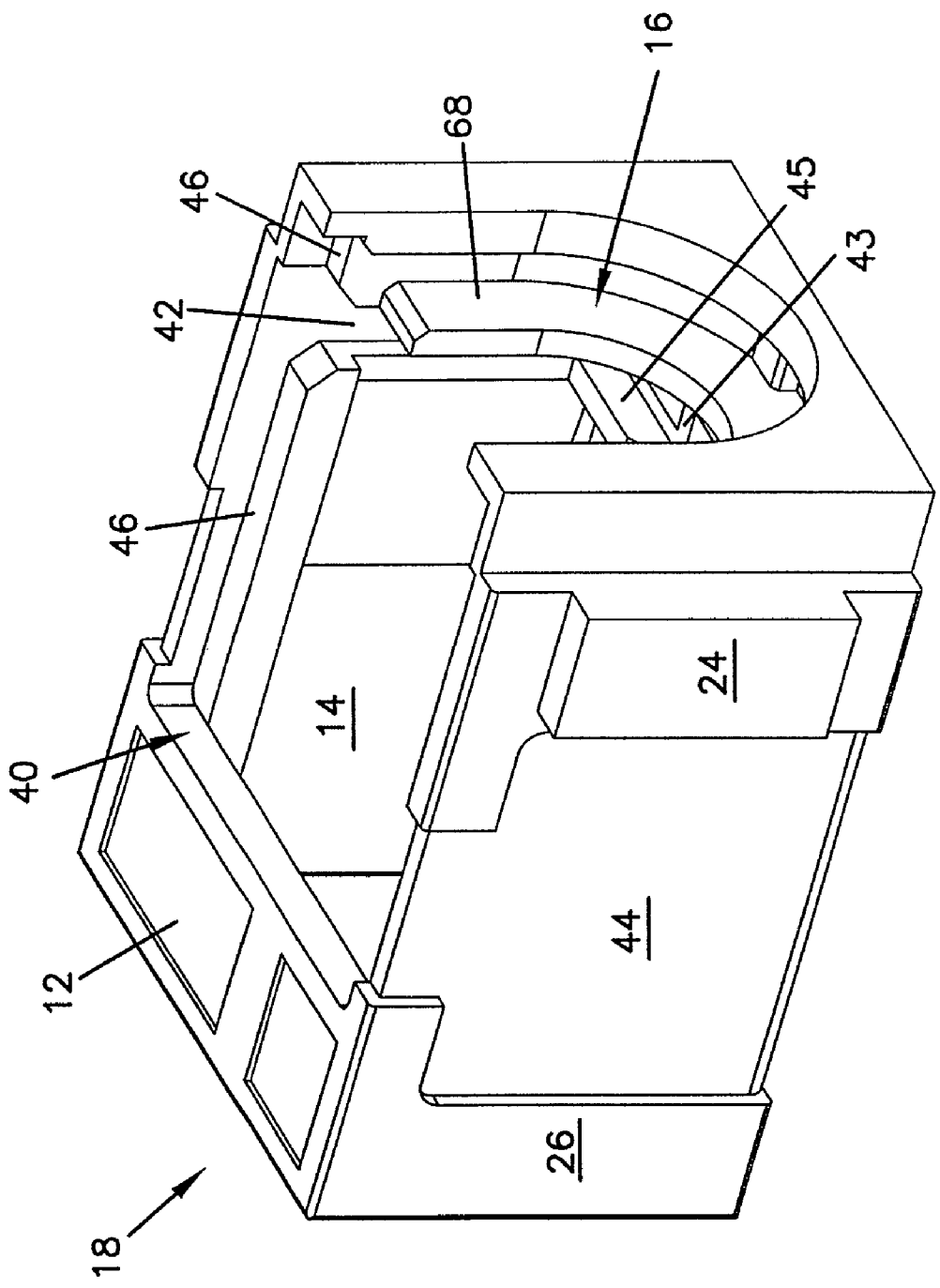
FIG. 15 is a perspective view of the main housing of the fiber optic connector holder of FIG. 1.
Figure 30:
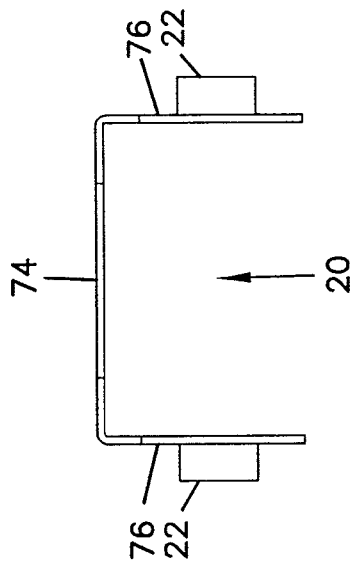
FIG. 30 is an end view of the clip of FIG. 29.
Figure 32:
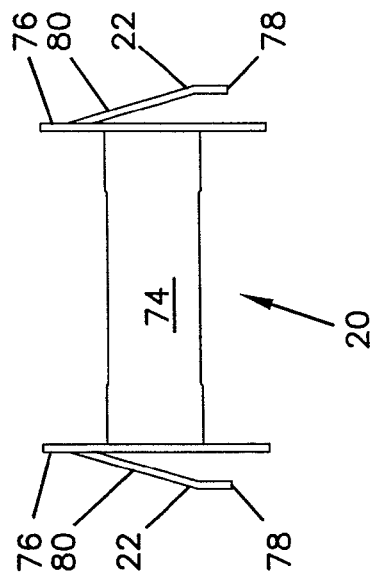
FIG. 32 is a bottom view of the clip of FIG. 29.
Figure 29:
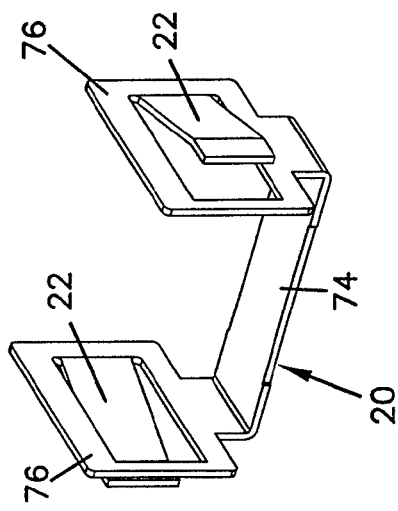
FIG. 29 is a perspective view of the clip of the fiber optic connector holder of FIG. 1.
Figure 31:
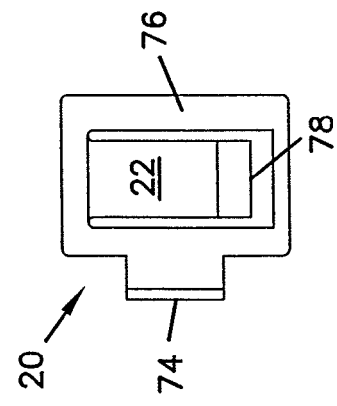
FIG. 31 is a side view of the clip of FIG. 29.

Reference will now be made in detail to exemplary aspects of the present invention which are illustrated in the accompanying drawings. Wherever possible, the same reference numbers will be used throughout the drawings to refer to the same or similar parts.

Fiber optic cables may be terminated with fiber optic connectors such as connector 100 shown in FIGS. 8 through 14, below. Optical fiber within these cables may be terminated at a polished end face held by a ferrule 102 in connector 100, as is well known in the art and shown in U.S. Pat. No. 5,317,663, incorporated herein by reference. These polished end faces and ferrules 102 need to be stored and protected until needed for connecting to other fiber optic cables or optical signal equipment.

Often a dust cap 104 may be placed about ferrule 102 and the polished end face of the optical fiber to protect the polished end face from contamination from dust, fingerprints or other items which might degrade optical signal transmission. While it is known to store these in known optical fiber adapters until the fiber within the attached cable is needed to connect to another fiber optic cable or optical signal equipment, such storage is less than ideal as adapters do not seal the polished end face from contamination as well as dust cap 104 securely fit and held about ferrule 102 of connector 100. Known adapters do not permit insertion of connector 100 which still has dust cap 104 in place about ferrule 102 and the polished end face of the cable.

Referring now to FIGS. 1 and 2, connector holder 10 includes a main housing 12 defining an interior cavity 14. An open end 18 permits insertion of a connector 100 into cavity 14 while an opposite opening 16 permits dust cap 104 to protrude from connector holder 10. A clip 20 is positioned about main housing 12 and includes a pair of spring mounting clips 22. A pair of flanges 24 extends from opposing sides 26 of main housing 12 adjacent spring clips 22. Clips 22 and flanges 24 cooperate to releasably mount holder 10 to an opening in a bulkhead as is shown below.

Main housing 12 also includes a bottom 30 with a keyway 28 to receive a keyed extension of connector 100 to consistently orient connector 100 for insertion into cavity 14. Opposite bottom 30 is an open top closed a cover 32. This is shown in more detail in FIG. 12, below. FIGS. 3 through 7 provide additional views of connector holder 10.

Referring now to FIGS. 8 through 13, connector 10 is shown with connector 100 positioned within cavity 18. Dust cap 104 extends from opening 16 of connector holder 10 while connector 100 is inserted through open end 14.

Referring now to FIGS. 13 and 14, connector holder 10 further includes an inner housing 34 with a pair of opposing releasable catches 36 and an opening 38 sized to receive dust cap 104. Inner housing 34 is positioned within main housing 12 through an open top 40 with opening 38 adjacent opening 16 and catches 36 adjacent open end 14. Cover 32 is then positioned within open top 40 and clip 20 placed about cover 32 and main housing 12. Cover 32 may be sealed within open top 40 by gluing, ultrasonic welding or a variety of known fastening techniques. Connector 100 includes a pair of opposing recesses 106 which receive catches 36 when connector 100 is inserted within holder 10.

As shown, connector 100 and holder 10 are FC style. Connector 100 and holder 10 may conform to other styles and formats of electrical connectors and adapters without straying from the spirit of the present invention.

Referring now to FIG. 15, main housing 12 also includes a slot 42 along both sides of cavity 14 to receiving and positioning a flange of inner housing 34 within cavity 14. A recess 44 is provided along sides 26 to receive clip 20. Open top 40 includes a ledge 46 upon which cover 32 is positioned to close cavity 14. An outer bulkhead 68 forms a portion of opening 16. An inner bulkhead 45 is positioned spaced apart from outer bulkhead 68 and these bulkheads cooperate to define slot 42. Between bulkheads 45 and 68 is a positioning surface 43 defining the bottom of slot 42.

Referring now to FIGS. 16 to 21, inner housing 34 includes a pair of clip arms 48 extending from a cross piece 50. Opening 38 for receiving dust cap 104 of connector 100 is in cross piece 50. Catches 36 are at the end of clip arms 48 opposite cross piece 50. Cross piece 50 includes a pair of flanges 52 which are received in slots 42 in main housing 12. As shown in FIG. 18, catches 36 include a ramped portion 54 which is engaged by connector 100 as connector 100 is inserted within cavity 14 through open end 18 of connector holder 10. Clip arms 48 are deflected outward allowing connector 100 to pass between catches 36. When connector 100 is fully inserted within cavity 14 (as shown in FIG. 13) catches 36 are received within recesses 106 and a retaining surface 56 of each catch 36 hold connector 100 within cavity 14.

Inner housing 34 is configured to permit insertion within slots 42 of cavity 14 of main housing 12 in either of two orientations. A pair of edges 66 of cross piece 50 properly position inner housing within cavity 14 with regard to cover 32 and main housing 12 so that opening 38 is aligned to receive dust cap 104.

Referring now to FIGS. 22 to 28, cover 32 includes a recess 58 for receiving clip 20 along an outer surface 68. Also in outer surface 68 is a recess 72 for receiving indicia. Along an inner surface 70 are formed a pair of edges 64 configured to be received upon ledges 46 of main housing 12. Extending from inner surface 70 is an outer flange 60 which cooperates with bulkhead 68 within main housing 12 to define opening 16. Also extending from inner surface 70 is a inner flange 62 which is spaced apart from outer flange 60 to form a slot 63. Slot 63 cooperates within slot 42 of main housing 12 to receive flanges 52 of inner housing 34.

At the top of slot 63 is a positioning surface 61 which cooperates with one of edges 66 of inner housing 34 to position inner housing 34 within cavity 14 so that opening 38 of inner housing 34 is aligned with opening 16. When assembled as connector holder 10, positioning surface 43 of main housing 12 and positioning surface 61 of cover 32 cooperate to engage both edges 66 of inner housing 34. Slot 42 of main housing 12 and slot 63 of cover 32 cooperate to capture flanges 52 of inner housing 34.

Referring now to FIGS. 29 to 32, clip 20 includes a cross piece 74 and a pair of opposing sides 76. Spring clips 22 are formed in sides 76. Sides 76 are received within recesses 44 of main housing 12 and cross piece 74 is received within recess 58 of cover 32. It is anticipated that clip 20 will be made of a resilient deformable metal to facilitate insertion and removal from an opening in a bulkhead. Spring clips 22 each include an end 78 and a ramped surface 80.

Figure 34:
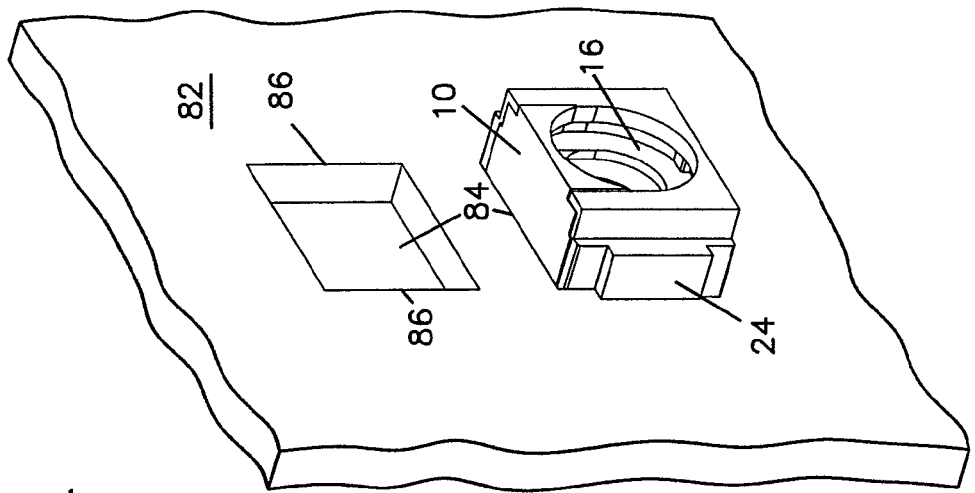
FIG. 34 is a perspective view of a bulkhead including a plurality of openings for receiving fiber optic connector adapters and the fiber optic connector holder of FIG. 1 inserted within one of the openings.
Figure 33:
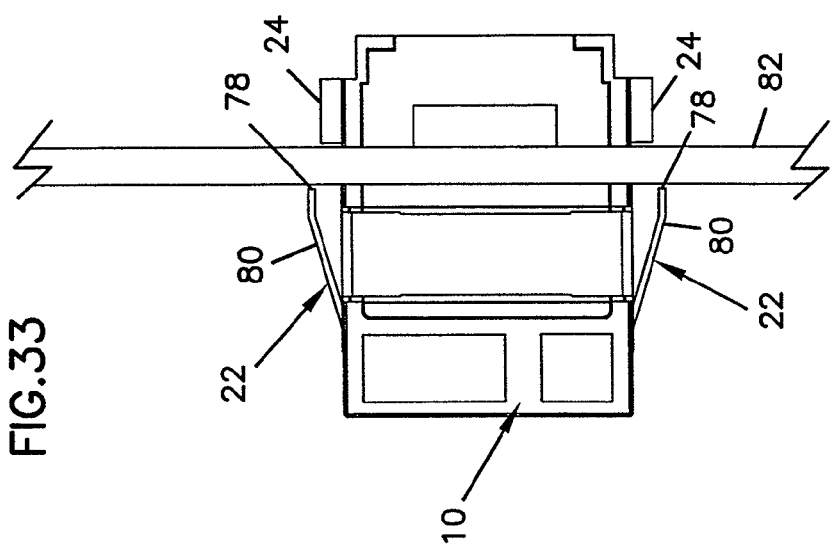
FIG. 33 is a top view of the fiber optic connector holder of FIG. 1 inserted within an opening in a bulkhead.

FIGS. 33 and 34 shows fiber optic connector holder 10 inserted within an opening 84 in a bulkhead 82. Bulkhead 82 may be part of a piece of telecommunications switching equipment such as a panel for making a plurality of connections between optical fiber cables including a plurality of openings 84 for adapters, as shown in FIG. 34. Alternatively, bulkhead 82 may include only a single opening 84 where only a single fiber optic connector holder 10 is needed.

Open end 18 of connector holder 10 is inserted through opening 84 until a pair of sides 86 of opening 84 engage ramped surfaces 80 of spring clips 22. Continued insertion of connector holder 10 will cause bulkhead sides 86 to deflect spring clips 22 inward toward sides 26. Bulkhead sides 86 will eventually pass beyond ends 78 of spring clips 22. Spring clips 22 will then spring back as shown in FIG. 34, capturing bulkhead sides 86 between ends 78 and flanges 24. Connector holder 10 may be removed from opening 84 by compressing spring clips 22 and removing in a direction opposite the insertion described above.

Alternatively, flanges 24 may be configured to include a fastener opening so that connector holder 10 can be mounted within opening 84 by removable fasteners.

It is anticipated that bulkhead should be interpreted broadly enough to include a telecommunications installation where openings 84 for mounting adapters and connector holders are included into sliding adapter packs, such as described in commonly-owned U.S. Pat. No. 5,497,444. The disclosure of this patent is incorporated herein by reference. Bulkhead should also be interpreted broadly enough to include a single opening in a wall or panel, a face plate of a telecommunications module for cross-connecting or interconnecting multiple optical fiber cables, as well as other telecommunications installations where one or more adapters may be mounted within an opening 84.

Referring now to FIGS. 35 through 38, dust cap 104 includes a central opening 108 to receive ferrule 102 when ferrule 102 is inserted through open end 110. Opposite open end 110 is closed end 112 which includes knurling 114 to provide better grip for removing dust cap 104. Central opening 108 fits about ferrule 102 to provide a seal about ferrule 102 and to hold dust cap to connector 100. Due to the reduction of air volume within central opening 108 when ferrule 102 is inserted (see FIG. 13), one or more helix shaped recesses 116 are provided within central opening 108 along inner walls 118. Recesses 116 extend from adjacent closed end 112 to open end 110. Recesses 116 are small enough prevent entry of unwanted contaminants and still permit air displaced within central opening 108 to be expelled when ferrule 102 is inserted so that dust cap 104 may be fully seat to connector 100. Recesses 116 also allow air to pass into central opening 108 when dust cap 104 is withdrawn from ferrule 102. The shape of each recess 116 is also designed to allow passage of air into and out of central opening 108 when dust cap 104 is removed or placed on ferrule 102 while inhibiting the passage of contaminants along the same path.

The above specification, examples and data provide a complete description of the manufacture and use of the composition of the invention. Since many embodiments of the invention can be made without departing from the spirit and scope of the invention, the invention resides in the claims hereinafter appended.

What is claimed is as follows:

1. A fiber optic connector holder system for holding a fiber optic connector, the connector holder system comprising:
    a connector holder having a first side positioned opposite from a second side, the connector holder defining an interior cavity with an open end at the first side of the connector holder, the interior cavity being configured to hold a fiber optic connector;
    a fiber optic connector positioned within the connector holder, the fiber optic connector including a connector housing having a ferrule at one end and a boot at an opposite end, the ferrule holding an optical fiber, the fiber optic connector being removable from the connector holder without removing the boot from the connector housing; and
    a dust cap having an open end positioned opposite from a closed end and defining a central opening, the central opening of the dust cap being mounted on the ferrule of the fiber optic connector to provide a seal about the ferrule and to hold the dust cap to the fiber optic connector, the dust cap being mounted on the ferrule of the fiber optic connector while the fiber optic connector is stored at the connector holder.

2. The fiber optic connector holder system of claim 1, wherein the connector holder includes mounting clips that are configured to secure the connector holder to a bulkhead.

3. The fiber optic connector holder system of claim 1, wherein the connector holder also comprises arms that deflect outward when the fiber optic connector is inserted into the cavity of the connector holder.

4. The fiber optic connector holder system of claim 3, wherein the arms define catches that include ramped portions which are engaged by the fiber optic connector as the fiber optic connector is inserted within cavity.

5. The fiber optic connector holder system of claim 1, wherein the dust cap defines internal helix shaped recesses.

6. The fiber optic connector holder system of claim 1, wherein knurling is provided at the closed end of the dust cap.

7. A method of holding a fiber optic connector comprising:
    providing a fiber optic cable terminated with a fiber optic connector including a connector housing, a boot at one end of the connector housing, a ferrule extending from an opposite end of the connector housing, and a dust cap releasably mounted about the ferrule to provide a seal about the ferrule;
    providing a fiber optic connector holder defining a central cavity having an open end sized to receive the fiber optic connector with the dust cap mounted about the ferrule; and
    inserting within the fiber optic connector holder the fiber optic connector with the dust cap mounted about the ferrule.

8. The method of claim 7, further comprising:
    providing a bulkhead with a plurality of openings; and
    mounting the fiber optic connector holder within one of the openings.

9. The method of claim 8, wherein providing the bulkhead comprises providing the bulkhead with a plurality of adapter openings and wherein mounting the fiber optic connector holder within one of the openings comprises mounting the fiber optic connector holder within one of the adapter openings.

10. The method of claim 7, wherein inserting the fiber optic connector within the fiber optic connector holder includes inserting the fiber optic connector so that the fiber optic connector engages retaining clips within the cavity of the fiber optic connector holder, the retaining clips being configured to releasably hold the fiber optic connector and the dust cap within the cavity.

11. A fiber optic connector holder system for holding a fiber optic connector, the connector holder system comprising:
   a fiber optic connector including a connector housing, a boot, and a ferrule holding an optical fiber;
   a connector holder that deflects outward to hold the fiber optic connector; and
   a dust cap having an open end positioned opposite from a closed end and defining a central opening, the central opening of the dust cap being mounted on the ferrule of the fiber optic connector to provide a seal about the ferrule and to hold the dust cap to the fiber optic connector, the dust cap being mounted on the ferrule of the fiber optic connector while the fiber optic connector is stored at the connector holder.

12. The fiber optic connector holder system of claim 11, wherein the connector holder also comprises arms that deflect outward when the fiber optic connector is inserted into the connector holder.

13. The fiber optic connector holder system of claim 12, wherein the arms include catches, each catch having a ramped portion and a retaining surface.

14. The fiber optic connector holder system of claim 11, wherein the connector holder mounts to a panel.

15. The fiber optic connector holder system of claim 14, wherein the connector holder includes mounting clips that are configured to secure the connector holder to the bulkhead.

16. The fiber optic connector holder system of claim 11, wherein the connector holder includes a main housing and an inner housing disposed within the main housing.

17. The fiber optic connector holder system of claim 16, wherein the inner housing including a dust cap opening sized to receive the dust cap mounted about the ferrule when the fiber optic connector is received.

18. A fiber optic connector holder system for holding a fiber optic connector, the connector holder system comprising:
   a connector holder having a first side positioned opposite from a second side, the connector holder defining an interior cavity with an open end at the first side of the connector holder, the interior cavity being configured to hold a fiber optic connector, the connector holder being configured to releasably mount to a bulkhead;
   a fiber optic connector positioned within the connector holder, the fiber optic connector including a ferrule holding an optical fiber; and
   a dust cap having an open end positioned opposite from a closed end and defining a central opening, the central opening of the dust cap being mounted on the ferrule of the fiber optic connector to provide a seal about the ferrule and to hold the dust cap to the fiber optic connector, the dust cap being mounted on the ferrule of the fiber optic connector while the fiber optic connector is stored at the connector holder.

19. A method of holding a fiber optic connector comprising:
   providing a fiber optic cable terminated with a fiber optic connector including a ferrule and a dust cap releasably mounted about the ferrule to provide a seal about the ferrule;
   providing a fiber optic connector holder defining a central cavity having an open end sized to receive the fiber optic connector with the dust cap mounted about the ferrule; and
   inserting within the fiber optic connector holder the fiber optic connector with the dust cap mounted about the ferrule; and
   releasably attaching the connector holder to a bulkhead so that the fiber optic connector is coupled to the bulkhead through the connector holder.

20. A fiber optic connector holder system for holding a fiber optic connector, the connector holder system comprising:
   a fiber optic connector including a ferrule holding an optical fiber;
   a connector holder that deflects outward to hold the fiber optic connector, the connector holder including a latching arrangement that releasably mounts the connector holder to a bulkhead; and
   a dust cap having an open end positioned opposite from a closed end and defining a central opening, the central opening of the dust cap being mounted on the ferrule of the fiber optic connector to provide a seal about the ferrule and to hold the dust cap to the fiber optic connector, the dust cap being mounted on the ferrule of the fiber optic connector while the fiber optic connector is stored at the connector holder.

* * * * *